3,506,734
WATERPROOF COATING COMPOSITION FOR
POLYESTER TYPE FABRIC
Melik Bedikian, Westwood, N.J., assignor to Nu-Dye &
Finishing Co., Inc., Paterson, N.J., a corporation of
New Jersey
No Drawing. Filed Aug. 15, 1967, Ser. No. 660,592
Int. Cl. C08g 47/10; C08f 35/02, 11/04
U.S. Cl. 260—826                              8 Claims

ABSTRACT OF THE DISCLOSURE

This invention relates to an improved waterproofing composition for polyester synthetic fabrics which renders the fabric coated durable yet resistant to repeated dry cleaning and intermittent home laundering at elevated temperatures. The composition comprises a resinous component, (A) composed of a polymerizable acrylic resin system and a cross-linkable quantity of an amino-aldehyde resin, a resinous component, (B) composed of a silicone prepolymer having pendant hydroxyl and hydrogen groups, and monomeric silane component containing (C) a carbon functional group and which may be represented by the following general formula:

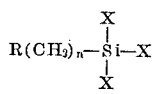

wherein R represents a reactive organic functional group such as vinyl, epoxy, nitrile, or also an amino attached to the terminal carbon of the silicone carbon side chain, $n$ represents a multiplicity of alkylene units usually less than about 10 and X represents a readily hydrolyzable group such as a lower alkoxy group or a halogen group.

BACKGROUND OF THE INVENTION

It has been proposed in the past to include various thermosetting materials such as a melamine formaldehyde condensates in coating compositions to increase the hardness of the surface thereby. However, in general such systems suffer one or more difficulties from excessive hardness especially when the thermosetting resin is applied in sufficient quantity to give adequate resistance to aqueous liquids and attack by solvents. If it is sought to improve upon this hardness or lack of flexibility, but cutting down on the amount of aminotriazine-formaldehyde resin in the coating, the solvent resistance drops below an acceptable level. In the case of textiles and textile products to which the coatings are applied much effort has been made to formulate and apply a coating composition which retains its flexibility characteristics while still having the durability adequate to protect it against the attack by solvents encountered in the case of dry cleaning and home laundering. However, up to the present this has proven to be an extremely difficult task in practice because as one improves the durability of the coating composition, a difficulty arises with regard to a diminution of the flexibility of the fabric so coated, as well as impairment of other properties of the material treated. This difficulty arises because of the poor compatibility of those resins which will supply enhanced durability to the fabric with those resins which will supply water resistance and flexibility to the same fabric.

More specifically, in contrast to nylon for example, when a polyester type of fabric substrate is coated with a water-proofing amount of a resinous blend of an acrylic resin, a carbon functional group containing monomer such as a vinyl or epoxysilane and a silicone polymer such as polydimethylsiloxane having pendent hydroxy groups, an excellent initial durability as well as water resistance is imparted to the fabric treated. However, in some cases after subsequent intermittent and repeated dry cleaning of the fabric in certain organic solvents such as perchloroethylene followed by home laundry or washing in a conventional home washing machine at temperatures in the order of 140° F., a problem of the continued durability of the coating may arise. While treatment with the dry cleaning solvents does not actually dissolve the polymeric coating on the fabric, it does nevertheless swell the film to the point where it can in some instances be dislodged in spots from the fabric under the conditions of heat and mechanical agitation encountered in the household laundry machine. Therefore, it would be of great value to the coating art to have available some means of preventing this and of obtaining in all instances the valuable properties and unexpected advantages of an acrylic-silicone resin system without any of the disadvantages which arise under particular types of use on polyester fabric substrates.

It is the object of the present invention therefore to provide a unique coating composition and a method of coating involving the same which renders capable imparting to polyester fabrics continuous water resistance and durability, under all conditions of cleansing and use.

It is a further object of the invention to disclose a unique coating composition which imparts all of these desirable properties to a polyester substrate and which is composed of such readily compatible ingredients that it is capable of instant application with a minimum of effort.

As a still further object the invention sets forth a method for the application of a durable water resistant coating to textiles and other products with facility of operation and simplicity of technique. Other related objects and advantages of the invention will become apparent from the following general description of the composition and its preferred methods of use.

THE INVENTION

In accord with the present invention, therefore, it has been found that the application to a polyester fabric of a coating composition comprising (A) any cross-linkable acrylic ester polymer such as an acrylic copolymer formed by reacting any one of a number of copolymerizable monoethylenically unsaturated monomers such as, for example, about 1 to 10% by weight of monomeric glycidyl methacrylate and 70 to 99% by weight of at least one lower aliphatic ester of acrylic acid such as ethylacrylate, methylacrylate, or the like. These ingredients are contained in a solvent mixture for the composition which is generally a mixture of 50 to 60% by weight of a saturated aliphatic alcohol containing $C_1$ to about $C_7$ carbon atoms and 40 to 50% of an ester of a lower aliphatic carboxylic acid. Formulated with the acrylic resin is from 1 to 20% of a thermosetting partially polymerized aminoaldehyde resin such as ureaformaldehyde or melamine formaldehyde generally in a mole ration range of 1.0 to 2.0 moles of the amino reactant to from 2.0 to 1.0 moles of the aldehyde reactant or any suitable known mole ratios of the two reactants; (B) a polymerizable silicone prepolymer having unreacted pendent hydroxyl and hydrogen functions therein; and (C) any silane containing carbon functional groups such as vinyl, epoxy, amino, nitrile, and the like. This silane may be represented by the following general structure:

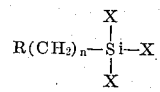

wherein R represents a reactive organic functional group such as vinyl, epoxy, nitrile, or amino attached to the terminal carbon of the silicone carbon side chain, $n$ represents alkylene group repeating units and X represents a readily hydrolyzable group such as a lower alkoxy or halogen group.

The silane component (C) when admixed with the polymerizable silicone prepolymer (B) and cured with a suitable organic acid catalyst in the particular manner described in greater detail below, is capable of further reacting with an acrylic resin component (A) and upon final cure thereof of producing a permanent coating on a selected substrate. The final fabric produced as a result of this coating may be demonstrated to have not only properties of waterproof nature, but also will be capable of retaining those properties despite repeated dry cleaning and mechanical abrasion in home laundry devices.

In the preferred manner of use of my coating composition the acrylic resin component (A) is present in from about 50 to 90% by weight of the entire composition, the amino-aldehyde thermosetting polymer which acts as a cross-linking agent is present in from 1% to about 20% by weight. Of course, these percentages can be adjusted to the particular formulation and conditions. The polymerizable silicone prepolymer (B) is normally present in from 2 to about 12% by weight of the entire mixture and preferably about 7% by weight of the entire mixture. The third component of the composition, namely, the monomeric silane material (C) is present in from about 2 to 12% by weight of the total composition and generally is about 7% by weight of the composition.

As a final cure of the resinous mixture in most instances an additional organic acid is normally added to the product to adjust the pH of the system to within the range of pH 5.0 to pH 6.0. If the pH of the system goes below 5.0 there occurs the danger of premature curing and if it rises in excess of about 6.0 the cure may be unduly delayed. The organic acid content will generally vary from about 2 to 4% by weight of the total mixture and is normally composed of such acids as lactic acid, benzoic acid, and paratoluene sulphonic acid, to name a few of such well known acid curing agents. The polymerization of the silicone system is frequently accelerated by the presence of polyvalent metals in the form of organo metallic complexes such as lead naphthenate, lead-oleate, ferro-oleate, and the like. In some instances it is advantageous to have a slow polymerization at room temperature over a longer period of time and in such case no catalytic promoter is added to the mixture.

The acrylic resin component (A) may be one of a number of well known acrylic resins. One of such resins which has been found to be quite effective has been a copolymer of glycidyl methacrylate with such acrylic acid esters as methylacrylate, although other acrylic acid esters such as ethylacrylate, isopropylacrylate, n-btuyl acrylate, 2-ethyl-hexyl acrylate, laurylacrylate or octadecyl acrylate may be employed. Besides the primary methacrylate and alkyl acrylate reactants noted above the copolymer may comprise also up to about 20% by weight of such materials as cyclohexyl acrylate, benzyl acrylate, methacrylates such as methyl methacrylate, ethyl methacrylate and butyl methacrylate, vinyl toluene, acrylonitrile, vinyl acetate or vinylidene chloride. The copolymer may be prepared in any suitable fashion provided it has a molecular weight in the range of about 50,000 to 250,000 viscosity units. As a general rule this molecular weight is most easily obtained by solution polymerization or by emulsion polymerization with the use of chain transfer agents.

The amino-aldehyde reactant material which is included in the initial mixture with the acrylic resin may be one of a large number of amino-aldehyde resinous materials such as those disclosed in U. S. Patent No. 2,579,985, and includes in addition to urea-formaldehyde, benzoguanamine formaldehyde and melamine formaldehyde, derivative melamine materials as alkylated di, tri, tetra, penta or hexamethylol melamines, or urea-formaldehyde derivatives such as mono-ethyl or dimethyl urea and the like. Such products may be produced in known manner by effecting reaction under neutral or alkaline conditions between melamine or urea and an aqueous solution of formaldehyde. In the case of melamine the ratio is generally 1 to 3 moles of melamine to from 2 to 6 or more moles of formaldehyde. The reaction mass is generally maintained at a temperature of not less than 70° C. during the reaction and to minimize polymerization of the monomer the desirable upper limit of reaction temperature is about 90° C.

As a result of the addition of the amino-aldehyde crosslinking prepolymer to the acrylic component it has been found hat the unreacted final product has strong unexcelled resistance to attack and swelling by organic solvents and subsequent flaking or chipping-off of the entire acrylic-silicone system from the polyester fabric substrate.

The polymerizable silicone prepolymer having unreacted hydroxyl and hydrogen groups therein is capable of further reaction with both the unreacted ethylenic linkages of the acrylic resin-amino-aldehyde resin component (A) as well as the reactive carbon functional group of the silane monomer (C) by reason of the existence of both of these functions. The silicone component may be prepared in a manner generally described in Rochow patent, U.S. 2,258,218 and involves a hydrolysis of a suitable alkyl slicone halide and dehydration of the resulting hydroxy product to obtain a mono or dimethyl silane which is then polymerized.

Moderately reactive silicone fluids are made up chemically of a mixture of reactive groups of the typical structure:

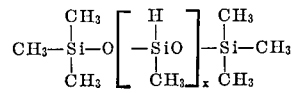

which because of the ≡Si—H is quite reactive. This silicone fluid reactivity is moderated by mixture with dimethylsiloxanes having some silanol groups ≡Si—OH. The silanol hydrolyzate fraction thus contains molecules in which the chain ending group is not a methyl group but rather an OH group:

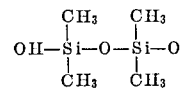

In some manner the two groups block each other and their reactivity takes place in the presence of a hydrolyzing medium. The presence of polyvalent metal catalyzes the reaction. The mechanism of the reaction is a silanol condensation. An alkaline medium accelerates the reaction and an acid medium slows it down. Control of pH within acid range keeps the silicone from premature polymerization. This does not take place until the crosslinking with the acrylic system occurs.

The monomeric silane component (C) having carbon functional groups may be represented by the structural formula:

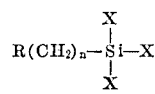

wherein R represents a reactive organic functional group such as vinyl, epoxy, nitrile, as well as amino attached to the terminal carbon of the silicone-carbon side chain, and X represents a readily hydrolyzable group such as a lower alkoxy group or a halogen like a chloro group and $n$ is from 0 to 20. Being in the monomer state and because of their high reactivity these carbon functional silicones possess a solvent-like property for the particular silicone resins employed herein.

As mentioned previously, silanol condensation is catalyzed by the presence of a polyvalent metal. The organo-metallic complex provides this polyvalent metal for this purpose.

The following several examples will serve to illustrate the preparation and use of my new coating composition in several of its preferred embodiments. It should be understood that these examples are included solely for purposes of illustration and are not intended to limit the scope of my invention in any manner. For a proper definition of the scope of that improvement attention may only be directed toward the several appended claims.

EXAMPLE 1

(a) A stainless steel beaker fitted with a stirrer was charged with 61 parts of Acryloid K–7003 (40% solution of a copolymer comprising from 1–10% by weight of glycidyl methacrylate and from 70–90% by weight of at least one ester of acrylic acid, i.e. ethyl acrylate), add 5 parts of a urea formaldehyde resin condensate (Uformite F–240) and 9 parts of Acryloid K–7004 (40% solution of a copolymer comprising from 1–10% by weight of glycidyl methacrylate; from 0–19% of a crosslinking agent such as acrylonitrile and from 70–90% by weight of at least one ester of acrylic acid, i.e. ethyl acrylate). The blend was mixed during 30 minutes. Into the mixed blend was added four parts of Catalyst MS (10% solution of benzoic acid and xylene) and the whole content of the beaker stirred for another 30 minutes.

(b) Into a second stainless steel beaker provided with a stirrer was charged 5.3 parts of Vinylsilane A–172 (vinyltris-2-methoxyethoxyl-silane) and while stirring 5.1 parts of SF–99 (hydroxy polydimethylsiloxane) was gradually added into the Vinylsilane. After the blend was stirred 20 minutes, .05 part of Nuocure 28 (28% solution of tin Octoate) was added into the silicones blend and an additional mixing of 15 minutes was done. Before addition, the amount of Nuocure 28 was diluted in ratio 1:3 in a solvent mixture containing 40 parts of methanol, 60 parts of ethylacetate.

(c) Blend (b) was gradually added into blend (a) while stirring continuously. The new blend was adjusted to 100 parts with a solvent mixture containing 40 parts of methanol and 60 parts of ethylacetate. A final stirring of 30 minutes was done.

(d) The resulting solution was applied to a dyed but unfinished 70 den. 90/110 polyester taffeta fabric by a floating knife coater at a rate of about ⅛ oz. dry weight per sq. yd. The coated fabric was dried at 220° F. for 20 seconds and then cured for 40 seconds at 400° F. By this process the coated fabric obtained an excellent durability to dry cleaning and durability to washing waterproofness. The "hand" of the fabric was not affected. The cold-flex property of the coated fabric is very good, and resistance to staining and soiling is also good.

Hydrostatic pressure tests (ASTM D–583–63), method II

Average of three tested samples.
Hydrostatic head readings (in cm. $H_2O$/column to penetration of sample).

Originally _____ 98
After 5 PCE dry cleanings (cm). _____ 90
Household wash at 140° F. after—
 1 hr. (cm.) _____ 89.0
 2 hrs. (cm.) _____ 89.0
 3 hrs. (cm.) _____ 87.0

EXAMPLE 2

(a) A stainless steel beaker fitted with a stirrer was charged with 61 parts of Acryloid K–7003 (40% solution of a copolymer comprising from 1–10% by weight of glycidyl methacrylate and from 70–90% by weight of at least one ester of acrylic acid, i.e. ethyl acrylate); add 5 parts of a melamine resin condensate (Uformite F–240) and 9 parts of Acryloid K–7004 (40% solution of a copolymer comprising from 1–10% by weight of glycidyl methacrylate; from 0–19% of a crosslinking agent such as acrylonitrile and from 70–90% by weight of at least one ester of acrylic acid, i.e. ethyl acrylate). The blend was mixed during 30 minutes. Into the mixed blend was added 4 parts of Catalyst MS (10% solution of benzoic acid in xylene) and the whole content of the beaker stirred for another 30 minutes.

(b) Into a second stainless beaker provided with a stirrer was charged 5.3 parts of Vinylsilane A–172 (vinyltris-2-methoxyethoxyl-silane) and while stirring 5.1 parts of SF–99 (hydroxy polydimethylsiloxane) was gradually added into the Vinylsilane. After the blend was stirred 20 minutes, .05 part of Nuocure 28 (28% solution of tin octoate) was added into the silicones blend and an additional mixing of 15 minutes was done. Before addition, the amount of Nuocure 28 was diluted in ratio 1:3 in a solvent mixture containing 40 parts of methanol, 60 parts of ethylacetate.

(c) Blend (b) was gradually added into blend (a) while stirring continuously. The new blend was adjusted to 100 parts with a solvent mixture containing 40 parts of methanol and 60 parts of ethylacetate. A final stirring of 30 minutes was done.

(d) The resulting solution was applied to a dyed but unfinished 70 den. 90/110 polyester taffeta fabric by a floating knife coater at a rate of about ⅛ oz. dry weight per sq. yd. The coated fabric was dried at 220° F. for 20 seconds and then cured for 40 seconds at 400° F. By this process the coated fabric obtained an excellent durability to drycleaning and durability to washing waterproofness. The "hand" of the fabric was not affected. The cold-flex property of the coated fabric was very good, and resistance to staining and soiling was also good.

Hydrostatic pressure tests (ASTM D–583–63), method II

Average of three tested samples.
Hydrostatic head readings (in cm. $H_2O$/column to penetration of sample).

Originally _____ 98, 100, 100
After 3 PCE dry cleanings _____ 93, 91, 95
Household wash at 140° F. after—
 1 hr. _____ 89, 94, 89
 2 hrs. _____ 90, 91, 88
 3 hrs. _____ 85, 87, 84

EXAMPLE 3

(a) A stainless steel beaker fitted with a stirrer was charged with 61 parts of Acryloid K–7003 (40% solution of a copolymer comprising from 1–10% by weight of glycidyl methacrylate and from 70–90% by weight of at least one ester of acrylic acid, i.e. ethyl acrylate), add 5 parts of a benzoguanamine formaldehyde resin condensate (Uformite MX–61) and 14 parts of Acryloid K–7004 (40% solution of a coplymer comprising from 1–10% by weight of glycidyl methacrylate; from 0–19% of a crosslinking agent such as acrylonitrile and from 70–90% by weight of at least one ester of acrylic acid, i.e. ethyl acrylate). The blend was mixed during 30 minutes. Into the mixed blend was added 4 parts of Catalyst MS (10% solution of benzoic acid in xylene) and the whole content of the beaker stirred for another 30 minutes.

(b) Into a second stainless beaker provided with a stirrer was charged 5.0 parts of Silane A–186 (beta (3-4 epoxy cyclo hexyl) ethyl trimethoxy-silane, and while stirring 5.1 parts of SF–99 (hydroxy polydimethylsiloxane) was gradually added into the silane. After the blend was stirred 20 minutes, 0.05 part of Nuocure 28 (28% solution of tin octoate) was added into the silicones blend and an additional mixing of 15 minutes was done. Before addition, the amount of Nuocure 28 was diluted in ratio 1:3 in a solvent mixture containing 40 parts of methanol, 60 parts of ethylacetate.

(c) Blend (b) was gradually added into blend (a) while stirring continuously. The new blend was adjusted to 100 parts with a solvent mixture containing 40 parts of methanol and 60 parts of ethylacetate. A final stirring of 30 minutes was done.

(d) The resulting solution was applied to a dyed but unfinished 70 den. 90/110 polyester taffeta fabric by a floating knife coater at a rate of about ⅛ oz. dry weight per sq. yd. The coated fabric was dried at 220° F. for 20 seconds and then cured for 40 seconds at 400° F. By this process the coated fabric obtained an excellent durability to dry cleaning and durability to washing waterproofness.

Hydrostatic pressure tests (ASTM D–583–63), method II

Average of three tested samples.

Hydrostatic head readings (in cm. H₂O/column to penetration of sample).

Originally _____ 95
After 5 PEC dry cleanings _____ 83
Household wash at 140° F. after—
  1 hr. _____ 80
  2 hrs. _____ 79
  3 hrs. _____ 74

Silane A–186 (beta (3-4 epoxy cyclo hexyl) ethyltrimethoxy-silane. The "hand" of the coated fabric with the above formulation is crispier than the usual hand with vinyl-silane. The introduction of epoxy-silane in the formulation brings a substantial improvement of the durability of the film to laundering. This circumstance is probably due to a better "affinity" of the epoxy-silane to the polyester fibers.

EXAMPLE 4

Proceed in a manner similar to that employed in the preceding Example 3, except to substitute for the beta (3-4 epoxy cyclo hexyl) ethyl trimethoxy-silane ingredient of that example an equivalent amount of the silane monomer gamma-aminopropyltriethoxy silane. A product of satisfactory properties will also be obtained.

EXAMPLE 5

Proceed in a manner similar to that employed in the preceding Example 3, except to substitute for the beta (3-4 epoxy cyclo hexyl) ethyl trimethoxy-silane ingredient of that example an equivalent amount of the silane monomer beta-cyanoethylmethyldiethoxy silane. A product of satisfactory properties will also be obtained.

What is claimed is:

1. A coating composition prepared by the method which comprises:
   (a) partially curing to an acrylic copolymer a copolymerizable mixture of about 1 to 10% by weight of a monoethylenically unsaturated monomer of glycidyl methacrylate and 70% to 99% parts by weight of a lower aliphatic acrylic acid ester, said copolymerizable mixture containing an amino-aldehyde condensate;
   (b) separately reacting under controlled conditions of acidity between a pH of 5 and 6, a mixture of an alkyl substituted silicone prepolymer having pendent hydroxy functions and a silane monomer of the formula

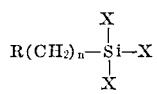

in which R represents a reactive organic functional group selected from the class consisting of a vinyl radical, epoxy, nitrile, and amino attached to the terminal carbon of the silicone-carbon side chain, X is lower alkoxy or halogen and $n$ is from 0 to 20, by adding the silicone prepolymer slowly to said silane monomer until the silicone prepolymer is substantially dissolved therein; and (c) adding the silicone prepolymer-silane monomer reaction product into the partially polymerized acrylic copolymer to form a flowable coating composition; and wherein said acrylic copolymer comprises about 50 to about 90% by weight of said composition, each of said silicone prepolymer and said silane compound comprise about 2 to about 12% by weight of said compositon and said amino-aldehyde condensate comprises about 1 to about 20% by weight of said composition.

2. A coating composition according to claim 1 wherein the amino-aldehyde condensate is a urea-aldehyde resin.

3. A coating composition according to claim 1 wherein the amino-aldehyde condensate is a melamine-aldehyde resin.

4. A coating composition accrding to claim 1 wherein the amino-aldehyde condensate is a urea-formaldehyde resin.

5. A method for imparting a durable water-resistant finish to a polyester substrate which comprises:
   (a) partially curing to an acrylic copolymer a copolymerizable mixture of about 1 to 10% by weight of a monoethylenically unsaturated monomer of glycidyl methacrylate and 70% to 99% parts by weight of a lower aliphatic acrylic acid ester, said copolymerizable mixture containing an amino-aldehye condensate;
   (b) separately reacting under controlled conditions of acidity between a pH of 5 and 6, a mixture of an alkyl substituted silicone prepolymer having pendent hydroxy functions and a silane monomer of the formula

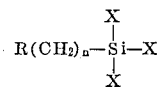

in which R represents a reactive organic functional group selected from the class consisting of a vinyl radical, epoxy, nitrile, and amino attached to the terminal carbon of the silicone-carbon side chain, X is lower alkoxy or halogen and $n$ is from 0 to 20, by adding the silicone prepolymer slowly to said silane monomer until the silicone prepolymer is substantially dissolved therein; and
   (c) adding the silicone prepolymer-silane monomer reaction product into the partially polymerized acrylic copolymer to form a flowable coating composition; and wherein said acrylic copolymer comprises about 50 to about 90% by weight of said composition, each of said silicone prepolymer and said silane compound comprise about 2 to about 12% by weight of said composition and said amino-aldehyde condensate comprises about 1 to about 20% by weight of said composition.

6. A method according to claim 5 wherein the amino-aldehyde condensate is a urea-formaldehyde resin.

7. A method according to claim 5 wherein the amino-aldehyde condensate is a melamine-formaldehyde resin.

8. The method of preparing a composition that imparts a durable water-resistant finish to a polyester substrate which comprises:
   (a) mixing an amino-aldehyde condensate with a copolymerizable mixture of about 1 to 10% by weight of a monoethylenically unsaturated monomer of glycidyl methacrylate and 70% to 99% parts by weight of a lower aliphatic acrylic acid ester and partially curing said admixture to an acrylic copolymer;
   (b) separately reacting under controlled conditions of acidity between a pH of 5 and 6, a mixture of an alkyl substituted silicone prepolymer having pendent hydroxy functions and a silane monomer of the formula

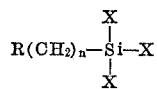

in which R represents a reactive organic functional group selected from the class consisting of a vinyl radical, epoxy, nitrile, and amino attached to the terminal carbon of the silicone-carbon side chain, X is lower alkoxy or halogen and $n$ is from 0 to 20, by adding the silicone prepolymer slowly to said silane monomer until the silicone prepolymer is substantially dissolved therein; and (c) adding the silicone prepolymer-silane monomer reaction product into the partially polymerized acrylic copolymer to form a flowable coating composition.

References Cited

UNITED STATES PATENTS 2,698,314  12/1954  Rust _____ 260—827
3,417,161  12/1968  Douds et al. _____ 260—825

FOREIGN PATENTS 1,360,222  3/1964  France.

SAMUEL H. BLECH, Primary Examiner

U.S. Cl. X.R.

117—138.8, 135.5; 260—46.5, 80.72, 851, 856, 23, 825, 827, 86.1